(12) United States Patent
MacDuff

(10) Patent No.: US 11,339,894 B2
(45) Date of Patent: May 24, 2022

(54) QUARTER-TURN PIN-VALVE ACTUATOR

(71) Applicant: Malcolm MacDuff, Victoria (CA)

(72) Inventor: Malcolm MacDuff, Victoria (CA)

(73) Assignee: Malcolm MacDuff, Victoria (CA)

( * ) Notice: Subject to any disclaimer, the term of this patent is extended or adjusted under 35 U.S.C. 154(b) by 0 days.

(21) Appl. No.: 16/978,125

(22) PCT Filed: May 17, 2019

(86) PCT No.: PCT/CA2019/050673
§ 371 (c)(1),
(2) Date: Sep. 3, 2020

(87) PCT Pub. No.: WO2020/232525
PCT Pub. Date: Nov. 26, 2020

(65) Prior Publication Data
US 2022/0090699 A1   Mar. 24, 2022

(51) Int. Cl.
*F16K 31/44* (2006.01)
*F16K 31/524* (2006.01)
(Continued)

(52) U.S. Cl.
CPC ........ *F16K 31/52408* (2013.01); *F16K 11/22* (2013.01); *F16K 27/003* (2013.01); *F24D 3/1066* (2013.01)

(58) Field of Classification Search
CPC ... F16K 11/22; F16K 31/528; F16K 31/52408
See application file for complete search history.

(56) References Cited

U.S. PATENT DOCUMENTS 3,127,786 A * 4/1964 Wooley ................... F16K 21/04
74/527
3,164,173 A * 1/1965 Semon .............. F16K 31/52408
137/625.26
(Continued)

FOREIGN PATENT DOCUMENTS

EP  1741991 A1  1/2007
JP  S5590863 U  6/1980
(Continued)

OTHER PUBLICATIONS

European Search Report dated Apr. 21, 2021 for European Patent Application No. 19868173.6, 8 pages.
(Continued)

*Primary Examiner* — Reinaldo Sanchez-Medina
(74) *Attorney, Agent, or Firm* — Morgan, Lewis & Bockius LLP

(57) ABSTRACT

A quarter-turn pin valve actuator has a housing and a rotatable core configured to rotate about a central axis inside the housing. The rotatable core has a two bearings mounted to roll in a circular path about the central axis. The actuator comprises a two-position ramped roller plate that is displaced axially when the bearings are rolled a quarter turn. The actuator includes a push plate and a spring disposed between the push plate and the ramped roller plate. The push plate has a central socket for receiving a pin of a pin valve to which the actuator is connected. When the rotatable core is rotated, the bearings exert a force via the ramped roller plate on the push plate which in turn displaces a pin of a pin valve to which the actuator is connected.

18 Claims, 7 Drawing Sheets

(51) Int. Cl.
*F24D 3/10* (2006.01)
*F16K 11/22* (2006.01)
*F16K 27/00* (2006.01)

(56) References Cited

U.S. PATENT DOCUMENTS

| | | | | |
|---|---|---|---|---|
| 4,804,164 | A * | 2/1989 | Nakazawa | F16K 31/52408 |
| | | | | 251/335.3 |
| 6,534,793 | B1 | 3/2003 | Heritier-Best | |
| 7,086,636 | B2 * | 8/2006 | Telep | F02M 26/69 |
| | | | | 123/568.24 |
| 8,555,926 | B2 | 10/2013 | MacDuff et al. | |
| 9,212,760 | B2 * | 12/2015 | Thorpe | F16K 31/5286 |
| 9,404,664 | B2 | 8/2016 | Jonsson | |
| 9,803,876 | B2 | 10/2017 | MacDuff et al. | |

FOREIGN PATENT DOCUMENTS

| | | | |
|---|---|---|---|
| JP | 2009243475 | A | 10/2009 |
| WO | 2010083058 | A1 | 7/2010 |
| WO | 2018124358 | A1 | 7/2018 |

OTHER PUBLICATIONS

International Search Report and Written Opinion dated Jan. 10, 2020 for International Patent Application No. PCT/CA2019/050673 filed May 17, 2019.

* cited by examiner

QUARTER-TURN PIN-VALVE ACTUATOR

CROSS REFERENCE TO RELATED APPLICATIONS

This application is a U.S. National Phase of International Application No. PCT/CA2019/050673 filed on May 17, 2019 entitled "Quarter-Turn Pin-Valve Actuator", which is incorporated by reference herein in its entirety.

TECHNICAL FIELD

The present invention relates generally to hydronic heating or cooling systems and, more particularly, to manifolds having pin valves.

BACKGROUND

Hydronic heating or cooling systems deliver warm or cool liquid, e.g. water, through conduits to heat or cool surfaces such as floors (radiant floor heating/cooling) or walls (radiant wall heating/cooling). Some such systems have manifolds that include pin valves. These pin valves are conventionally actuated using wax actuators.

In conventional manifolds, a wax actuator is placed over each pin valve forcing the pin downward to close the valve. When the wax is heated, the pin valve opens. Constant power is normally used to keep the wax heated, thereby allowing the valve to stay open. Normally, this consumes approximately 1-3.5 watts of power. To close these valves, power is released, thereby allowing the valve to close once the wax solidifies and expands. These wax valves can be made either as normally open valves or as normally closed valves. Yet a further drawback of wax valves is that they are highly temperature-dependent, i.e. current wax actuators will not close if the water temperature is too high.

In view of these various drawbacks, a new or improved pin valve actuator would be highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a novel quarter-turn pin valve actuator. In general, and as will be described in greater detail below, the actuator has a rotatable core with two bearings that roll in a circular path about a central axis of rotation of the core. A two-position ramped plate is displaced axially when the bearings are rolled a quarter turn. The displacement of the ramped plate exerts force on a push plate which in turn displaces the pin of the pin valve.

An inventive aspect of the disclosure is a novel quarter-turn pin valve actuator comprising a housing and a rotatable core configured to rotate about a central axis inside the housing. The core has a two bearings mounted to roll in a circular path about the central axis. The actuator comprises a two-position ramped roller plate that is displaced axially when the bearings are rolled a quarter turn. The actuator includes a push plate and a spring disposed between the push plate and the ramped roller plate. The push plate has a central socket for receiving a pin of a pin valve to which the actuator is connected. When the rotatable core is rotated, the bearings exerts a force via the ramped roller plate on the push plate which in turn displaces the pin of the pin valve.

Another inventive aspect of the disclosure is a manifold having a pin valve, the pin valve including a pin that is moves axially to open or close the pin valve. The manifold further includes a quarter turn pin valve actuator as described in the preceding paragraph.

Yet another inventive aspect of the disclosure is a method of operating a manifold using the actuator described above. The method entails rotating the rotatable core inside the housing about the central axis. Rotating the core causes two bearings mounted to the core to roll in a circular path about the central axis. When the bearings are rolled a quarter turn causes a two-position ramped roller plate to displace axially. The actuator includes a push plate and a spring disposed between the push plate and the ramped roller plate. The push plate has a central socket for receiving a pin of a pin valve. Displacing the push plate thus exerts a force on the pin of the pin valve, thereby causing the pin to move between open and closed positions.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. The description should in no way be limited to the illustrative implementations, drawings, and techniques illustrated below, including the exemplary designs and implementations illustrated and described herein, but may be modified within the scope of the appended claims along with their full scope of equivalents.

Figure 1:
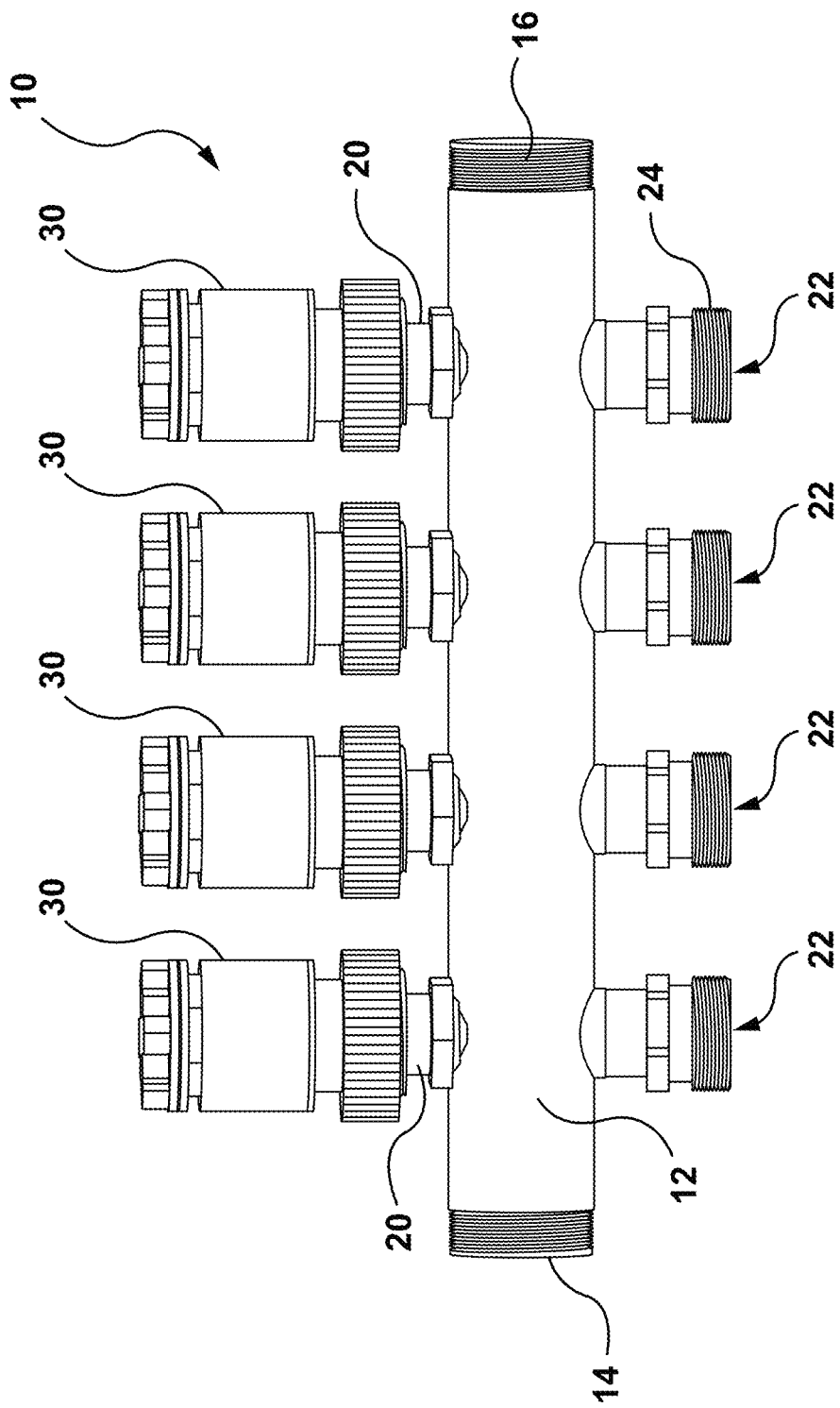
FIG. 1 is a frontal view of a manifold having a plurality of pin valves and quarter turn pin valve actuators.
Figure 2:
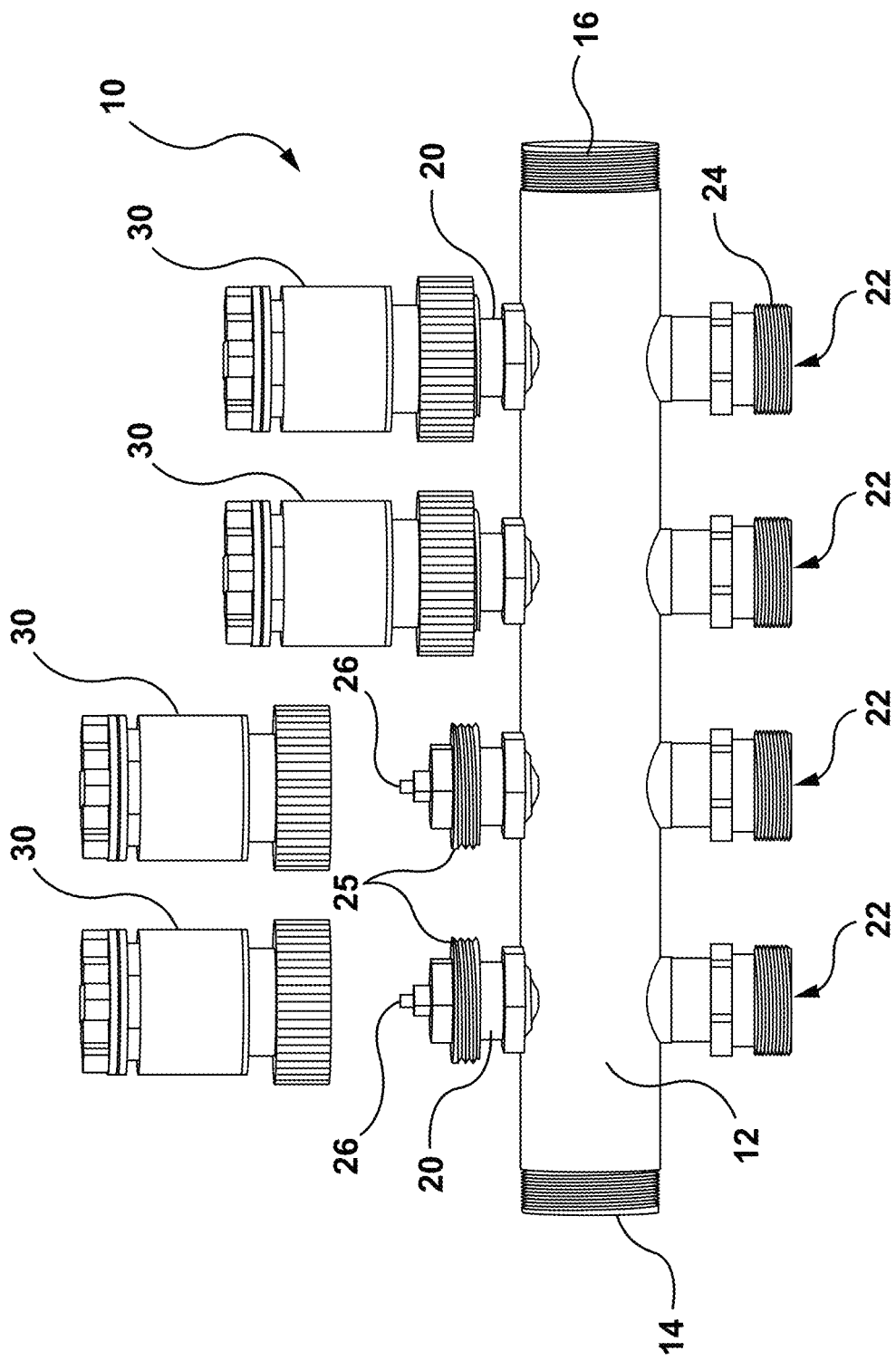
FIG. 2 is a frontal view of a manifold having a plurality of pin valves and quarter turn pin valve actuators, showing two of the actuators disconnected from their respective valves to show the exposed pins of the valves.
Figure 3:
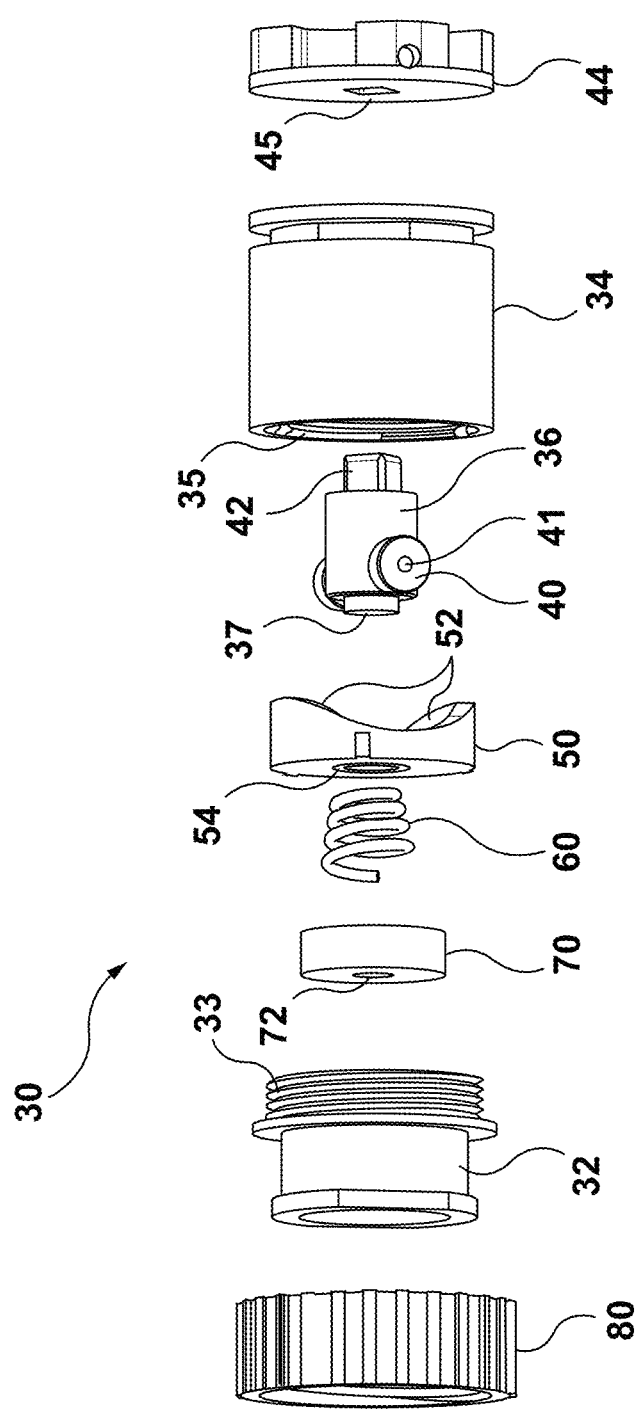
FIG. 3 is an exploded view of the quarter-turn pin valve actuator.
Figure 4:
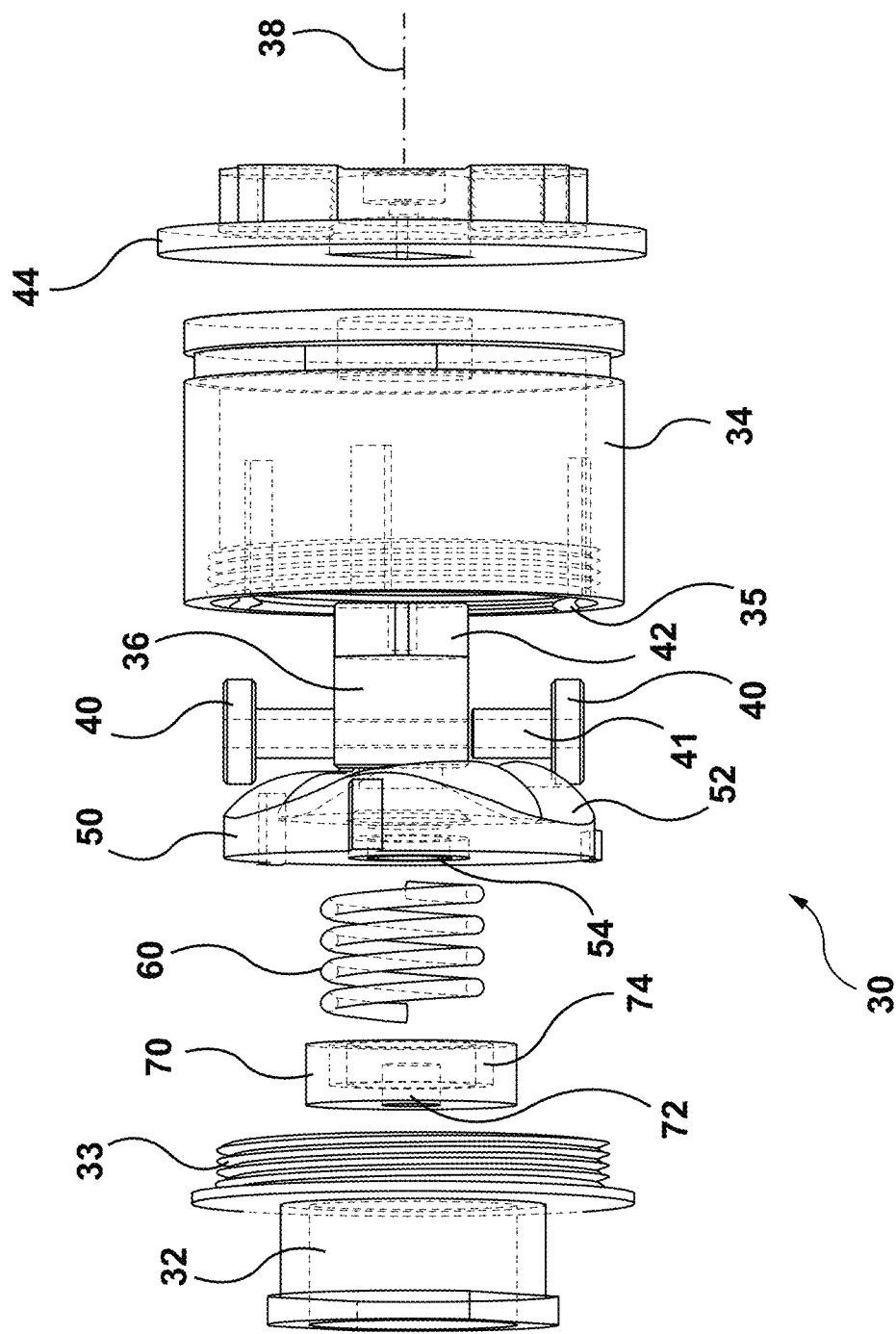
FIG. 4 is another exploded view of the quarter-turn pin valve actuator.
Figure 5:
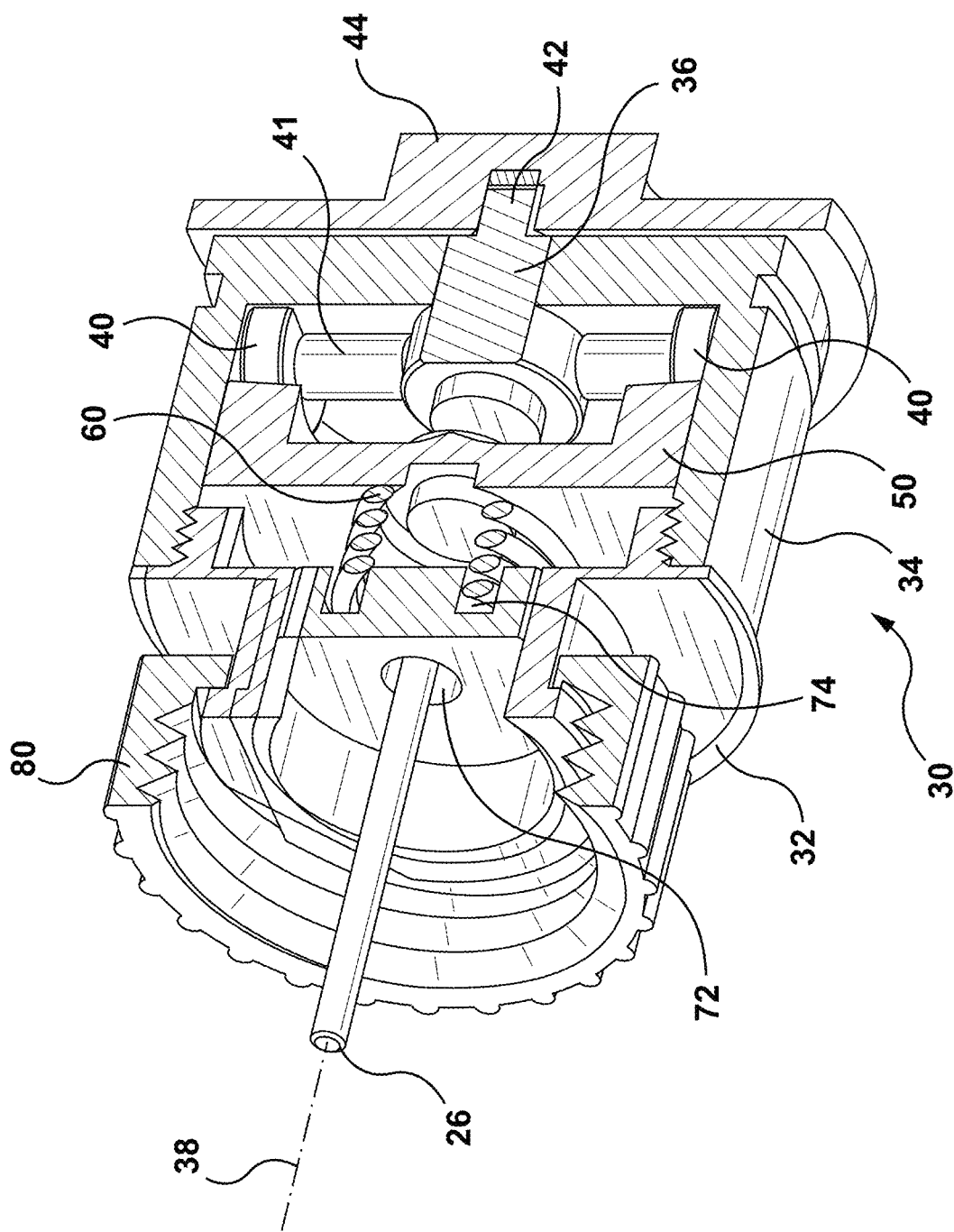
FIG. 5 is a cross-sectional view of the quarter-turn pin valve actuator and further showing the pin.
Figure 6:
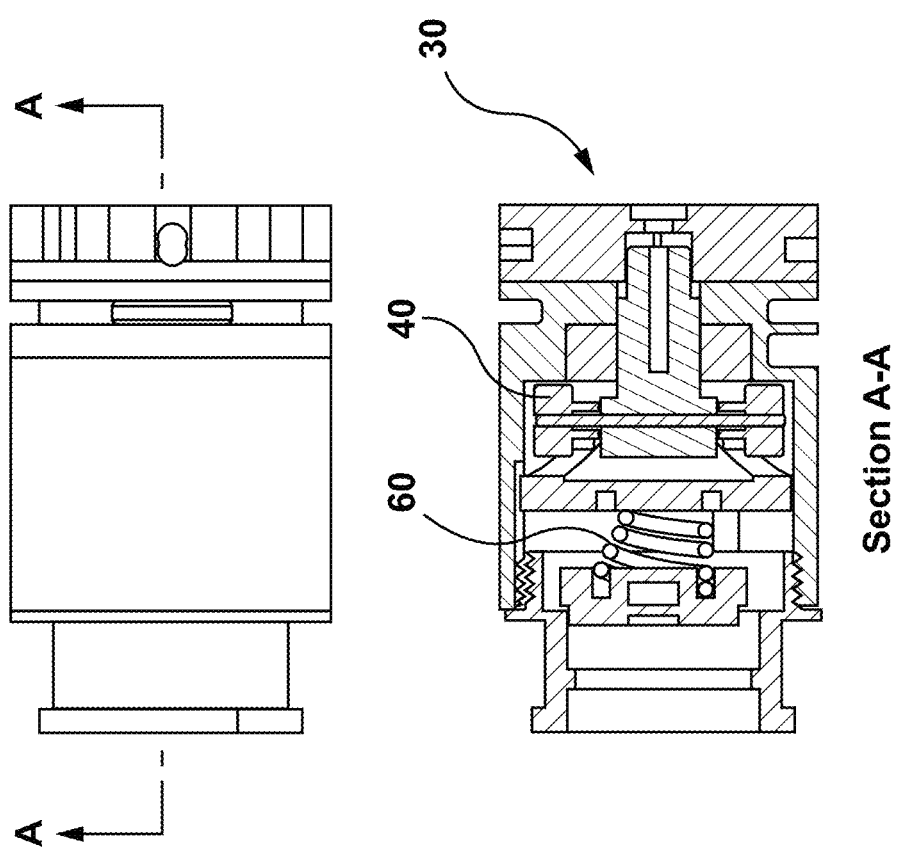
FIG. 6 is a cross-sectional view of the quarter-turn pin valve actuator.

FIGS. 1 and 2 depict a manifold generally designated by reference numeral 10. The manifold 10 has a main conduit 12 (water supply tube) that includes an inlet 14 and an outlet 16. The manifold 10 has a plurality of valves 20 disposed in a row along the main conduit 12 as shown in the figures. In this example, there are four valves 20 arranged in-line with equal spacing although the number, location and spacing of the valves 20 may be varied in other variants of the manifold. Each valve is a pin valve having a pin that is displaceable to open and close the valve. The valves 20 control the flow of fluid from the main conduit 12 through the four valve ports 22 into supply lines, tubes or hoses (which are not shown) for delivery of the hydronic heating or cooling fluid to, for example, different zones or rooms.

Each of the valves can be opened or closed independently. In the embodiment shown in FIGS. 1-2, the valves 20 are pin valves. These valves can be opened or closed by axial displacement of the pin inside the pin valve.

The manifold, when used in a hydronic heating or cooling system, can thus control the flow of water or other such fluid to any one or more of the zones of the dwelling or building in which the hydronic system is installed. The main conduit receives a heating or cooling liquid for a hydronic heating or cooling system from an upstream source that is not shown in the figures.

As shown in FIGS. 1-2, the four valve ports 22 have threaded connectors 24 for connecting to the supply lines, tubes or hoses. As shown in FIGS. 1 and 2, quarter-turn pin valve actuators 30 are aligned with each of the valves 20 and valve ports 22. The quarter-turn pin valve actuators 30 are mechanically connected to the valves 20 to enable the quarter-turn pin valve actuators 30 to actuate the pins 26 of the pin valves 20. In the illustrated embodiment, the actuators are threaded to externally threaded connectors 25 of the valves 20.

FIG. 2 depicts two of the quarter-turn pin valve actuators 30 disconnected from their respective pin valves 20. FIG. 2 shows the pins 26 of the pin valves exposed. The pins 26 are aligned axially with the quarter-turn pin valve actuators 30 and with the valve ports 22. The quarter-turn pin valve actuators 30, valve ports 22 and pins 26 are orthogonal to the main conduit 12. The pins are slender and elongated structures.

FIGS. 3-6 depict a quarter-turn pin valve actuator 30 in accordance with one embodiment of the present invention. In the embodiment depicted by way of example in FIGS. 3-6, the quarter-turn pin valve actuator 30 has a housing formed in this example by a screw cap 32 and a screw cap top 34. The screw cap 32 has external threads 33 and the screw cap top 34 has internal threads 35 that mate with the external threads 33 of the screw cap 32. The screw cap 32 and the screw cap top 34 are thus threaded together to form the housing of the actuator. Inside the housing of the actuator is a rotatable core 36 which is designed to rotate about a central axis 38 of the actuator. Note that the central axis of the actuator is the same axis that extends through the valve and valve port to which the actuator is connected. The rotatable core 36 has two bearings 40 (e.g. roller bearings or ball bearings) mounted on a common axle 41 (e.g. a shaft or rod) to roll in a plane that is perpendicular to the central axis. The two bearings 40 are configured to roll around a circular path inside the housing that is centered about the central axis 38. The rotatable core 36 has a non-circular protrusion 42, e.g. a square driver or stem that is configured (i.e. shaped and sized) to connect to a similarly shaped and sized socket 45 of a cross gear 44, handle or other external device that mechanically controls the actuator. The rotatable core 36 also may have an axially aligned cylindrical nub for supporting and aligning the rotatable core. Abutting the bearings 40 is a ramped roller plate 50 which may have a hole for receiving the cylindrical nub of the rotatable core. The ramped roller plate in the illustrated embodiment is a two-position ramped roller plate. The ramped portions 52 are disposed on one face. The ramped roller plate has a central annular groove 54 on the other face. The central annular groove is sized and shaped to receive a first end of a spring 60, e.g. a coil spring. The spring 60 is disposed (e.g. compressed) between the roller plate 50 and a push plate 70. In the illustrated embodiment, the push plate 70 is a disk-shaped component having an annular groove 74 on one circular face for receiving a second end of the spring 60. The push plate 70 has a central socket 72 on a second circular face for receiving an end of the pin 26. The actuator has a locknut 80 or a mechanically equivalent fastening device with internal threads to fasten the actuator to the external threads of the valve 20 via the externally threaded connectors 25 shown in FIG. 2.

The quarter turn pin valve actuator is designed to operate with a four-position indicator handle or cross gear or equivalent mechanical device. In other words, the quarter turn pin valve actuator is designed to be manually turned (using a handle) or be used with a linear actuator device that will index and automatically turn a cross gear. Alternatively, an individual motor mechanism may be connected to each quarter turn actuator.

In operation, a rotation of the handle, cross gear or equivalent device 44 causes rotation of the rotatable core 36 which in turn causes the two roller bearings 40 to roll around a circular path defined by an interior annular slot inside the housing of the actuator 30. Rotation of the roller bearings exerts a force on the two-position ramped roller plate 50 which causes the roller plate 50 to move axially (e.g. to move up/down). Note that the roller plate moves axially but does not turn. The ramped roller plate moves axially (e.g. moves up/down) as the handle or cross gear turns. The ramped roller plate is displaced axially every time the handle or cross gear is rotated 90 degrees. Thus, a further 90-degree rotation causes the ramped roller plate to return to its original position. Accordingly, each successive 90-degree rotation (either in the same rotational direction or in the opposite rotational direction) causes the ramped roller plate to move axially from a first position (either open or closed) to a second position (either closed or open). The spring 60 has a spring constant that is double that of the spring in the pin valve. Alternatively, the spring has a spring constant greater than that of the spring in the pin valve. This enables the handle or cross gear to always be able to rotate a quarter turn even if the pin valve is jammed. The pin valve may be jammed because debris can sometimes cause the pin valves to not fully close. The spring 60 also allows for flexibility in the pin height. If the pin height varies from one pin valve to another, the spring 60 enables the actuator to adjust to accommodate the length of the pin.

Figure 7:
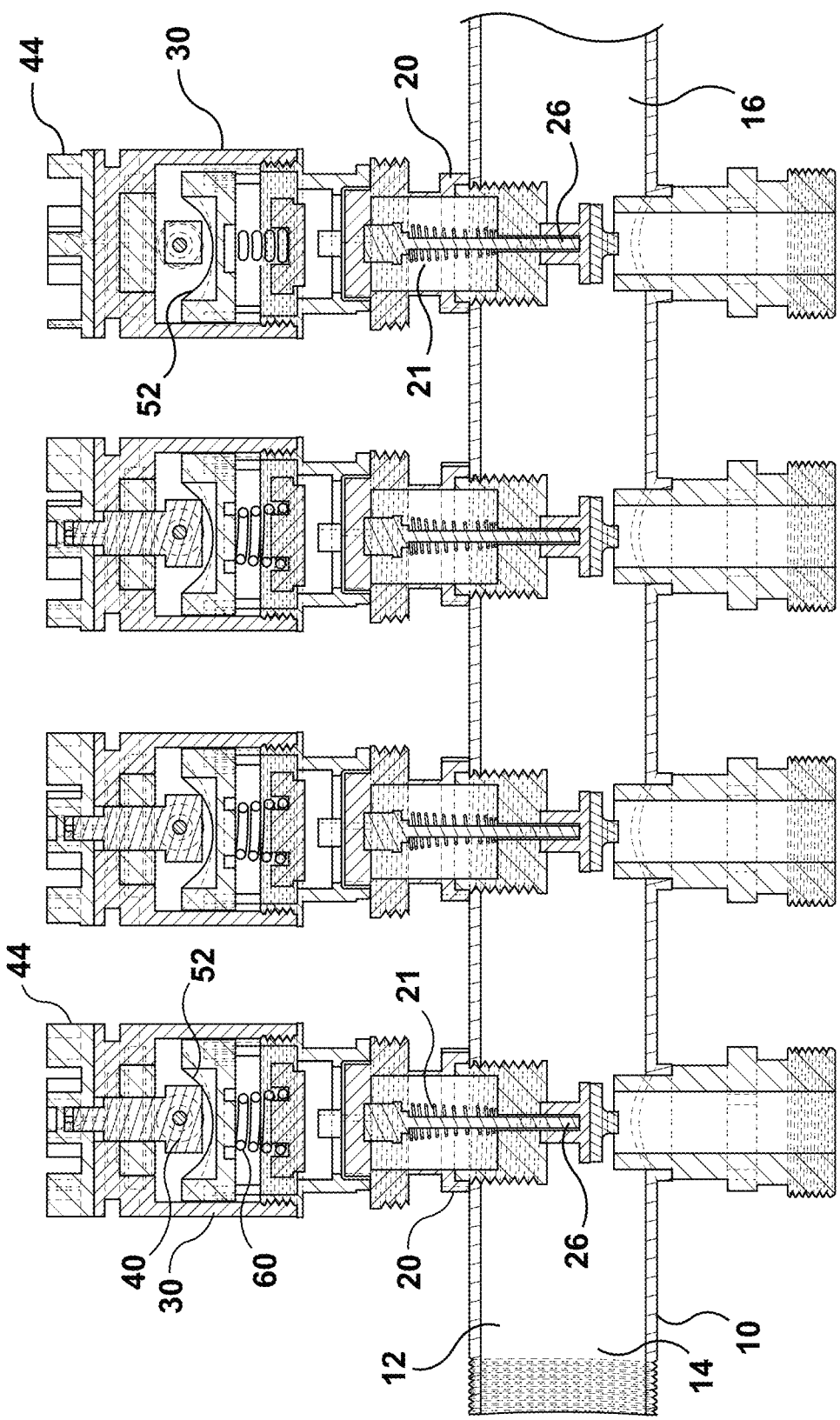
FIG. 7 is a cross-sectional view of the manifold, four pin valves and four quarter-turn pin valve actuators.

FIG. 7 is a cross-sectional view of the manifold 10, four pin valves 20 and four quarter-turn pin valve actuators 30. In FIG. 7, the valves 20 are shown in the open position, i.e. with the pin 26 or "plunger" in its up position. Each valve 20 has a valve spring 21 that mechanically biases the pin 26. As noted above, in one embodiment, the spring 60 has a spring constant double that of the valve spring 21.

The novel actuator is not limited by temperature the way that wax actuators are. Unlike wax actuators, which are unable to close if the water temperature is too high, the novel actuator will continue to function at high temperatures.

The novel actuator also saves energy because energy is only used to open or close the valves when used with a linear actuator device that will index and automatically turn or an individual motor mechanism on each quarter turn actuator. This is far more energy-efficient than wax actuators which draw current when idle.

This novel actuator also enables a novel method of actuating a pin valve of a manifold. The method entails rotating a rotatable core of a quarter-turn pin valve actuator by ninety degrees about a central axis thus defining a quarter turn. Rotating the core causes two bearings mounted on axle connected to the core to roll in a circular path ninety degrees about the central axis. The bearings axially displace a ramped roller plate which causes a push plate having a central socket for receiving a pin of a pin valve to displace the pin of the pin valve.

It should be understood that this exemplary embodiment represents only one way of implementing this technology. In other words, many variations, modifications and refinements may be made to the mechanisms presented herein without departing from the fundamental inventive concept(s).

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A quarter-turn pin valve actuator for actuating a pin of a pin valve, the actuator comprising:
    a housing;
    a rotatable core disposed inside the housing and configured to rotate about a central axis;
    two bearings mounted to roll in a circular path about the central axis;
    a ramped roller plate that is displaceable axially when the bearings are rolled a quarter turn; and
    a push plate having a central socket for receiving a pin of a pin valve to which the actuator is connected such that when the rotatable core is rotated, the bearings exert a force via the ramped roller plate on the push plate which in turn displaces the pin of the pin valve.

2. The quarter-turn pin valve actuator of claim 1 wherein the ramped roller plate is a two-position ramped roller plate.

3. The quarter-turn pin valve actuator of claim 1 further comprising: a spring disposed between the push plate and the ramped roller plate.

4. The quarter-turn pin valve actuator of claim 3 wherein the push plate comprises an annular groove to receive one end of the spring.

5. The quarter-turn pin valve actuator of claim 4 wherein the ramped roller plate comprises an annular groove to receive another end of the spring.

6. The quarter-turn pin valve actuator of claim 5 wherein the spring has a spring constant double that of a spring in the pin valve.

7. The quarter-turn pin valve actuator of claim 1 wherein the rotatable core comprises a non-circular protrusion configured to connect to a similarly shaped and sized socket of a cross gear or handle.

8. The quarter-turn pin valve actuator of claim 1 wherein the rotatable core comprises an axle on which the bearings are mounted.

9. The quarter-turn pin valve actuator of claim 1 wherein the circular path around which the two bearings roll is in plane perpendicular to the central axis.

10. The quarter-turn pin valve actuator of claim 3 wherein the spring is a coil spring that is aligned with the central axis.

11. The quarter-turn pin valve actuator of claim 1 wherein the rotatable core has a cylindrical nub is aligned with the central axis and wherein the cylindrical nub is configured to be received within a corresponding hole in the ramped roller plate.

12. The quarter-turn pin valve actuator of claim 1 wherein the housing comprises a screw cap and a screw cap top fastened together by threads.

13. The quarter-turn pin valve actuator of claim 12 further comprising: a locknut to connect the screw cap to a threaded connector of the pin valve.

14. A manifold comprising: a pin valve and a quarter-turn pin valve actuator as claimed in claim 1, wherein the actuator is operatively connected to the pin valve to open and close the pin valve.

15. A method of actuating a pin valve of a manifold, the method comprising: rotating a rotatable core of quarter-turn pin valve actuator by ninety degrees about a central axis thus defining a quarter turn, wherein rotating the rotatable core causes two bearings mounted on an axle connected to the rotatable core to roll in a circular path ninety degrees about the central axis, and wherein the bearings axially displace a ramped roller plate which causes a push plate having a central socket for receiving a pin of a pin valve to displace the pin of the pin valve.

16. The method of claim 15 wherein rotating the rotatable core is performed by manually rotating a handle connected to the rotatable core.

17. The method of claim 15 wherein rotating the rotatable core is performed by rotating a cross gear connected to the rotatable core.

18. The method of claim 15 wherein the ramped roller plate exerts a force on the push plate via a spring disposed between the push plate and the ramped roller plate.

\* \* \* \* \*